J. K. VANATTA.
POWER PLANT CONSTRUCTION FOR RAILWAY MOTOR CARS.
APPLICATION FILED FEB. 2, 1918.
1,271,630.
Patented July 9, 1918.
5 SHEETS—SHEET 2.
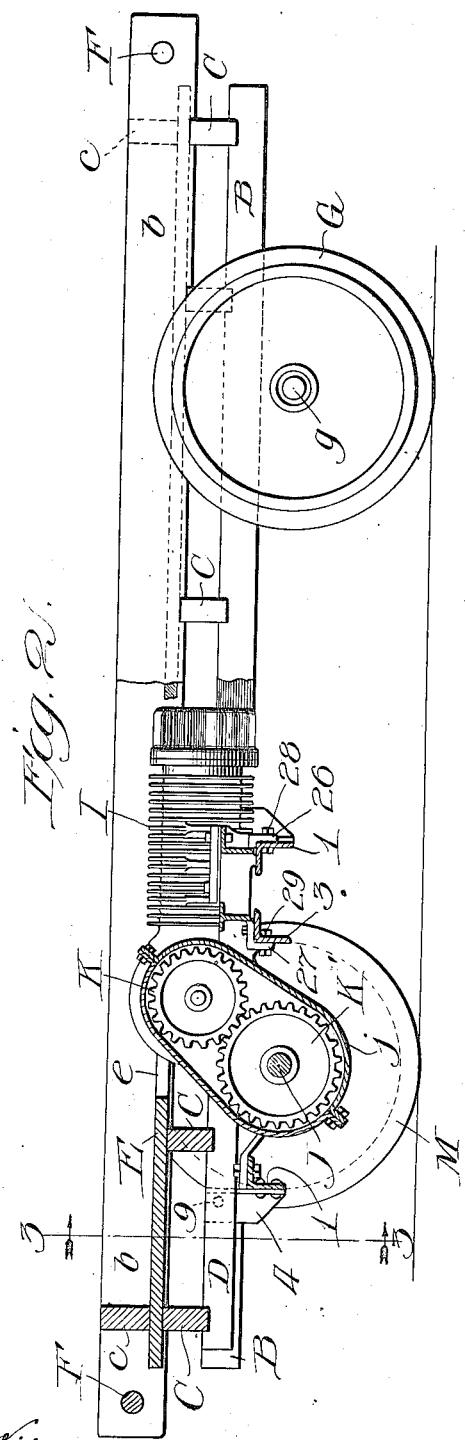
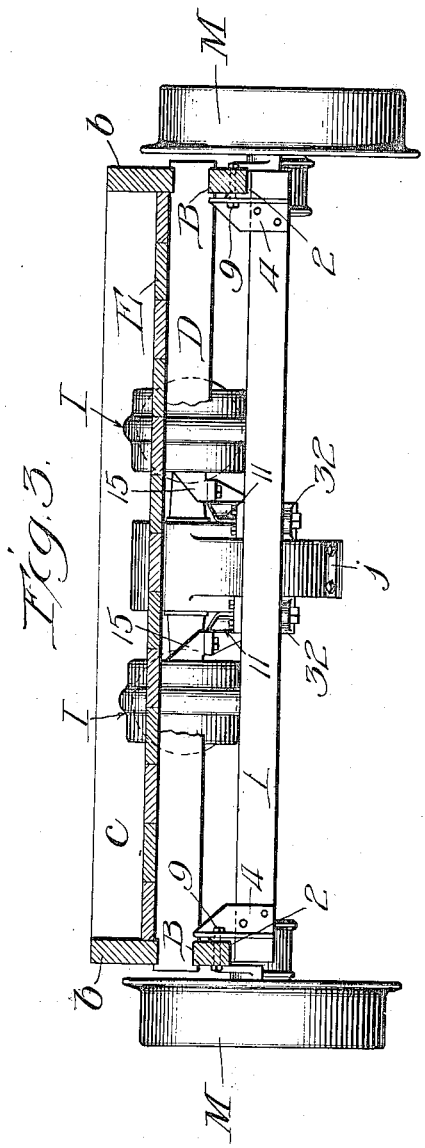

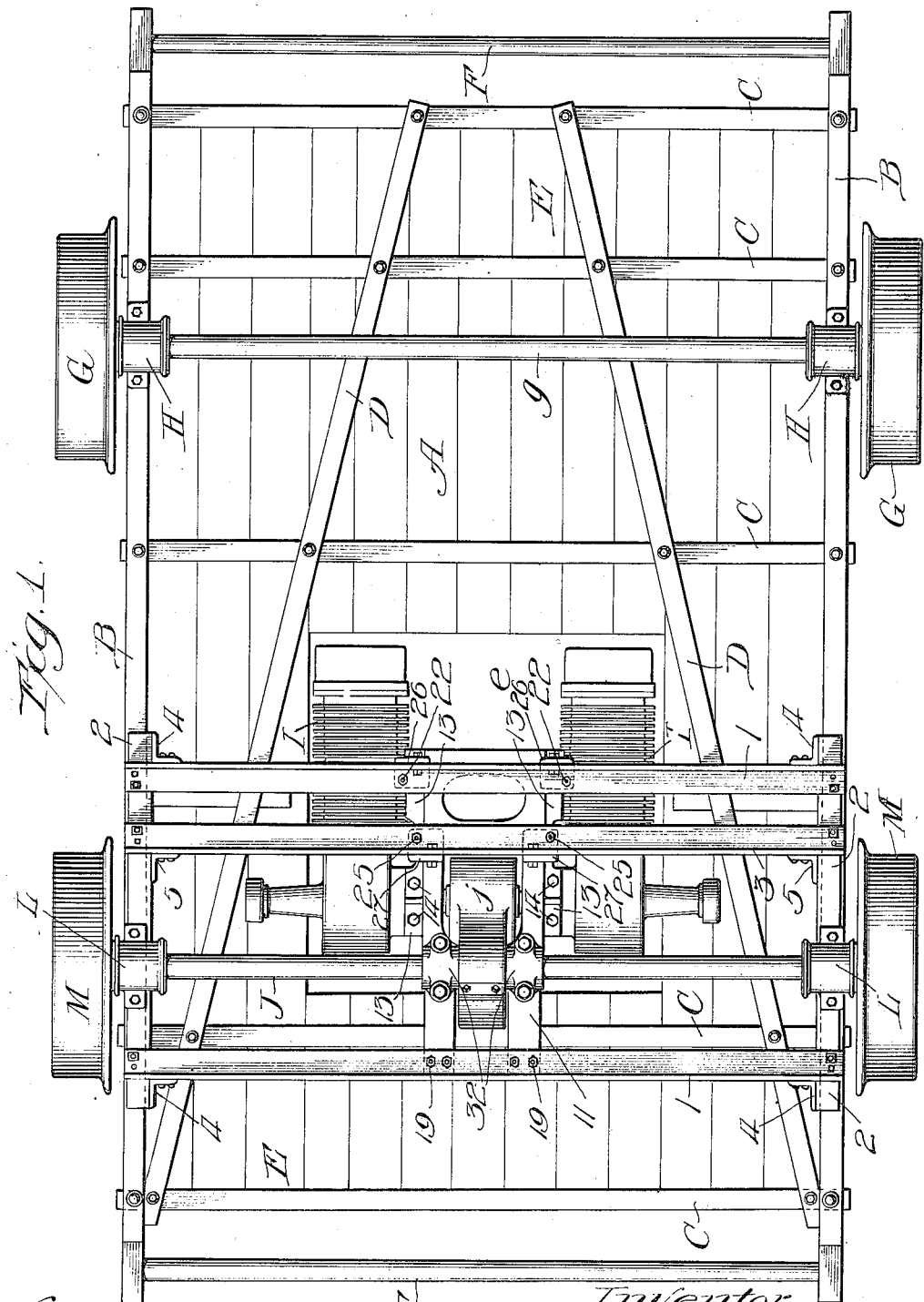

J. K. VANATTA.
POWER PLANT CONSTRUCTION FOR RAILWAY MOTOR CARS.
APPLICATION FILED FEB. 2, 1918.
1,271,630.
Patented July 9, 1918.
5 SHEETS—SHEET 3.
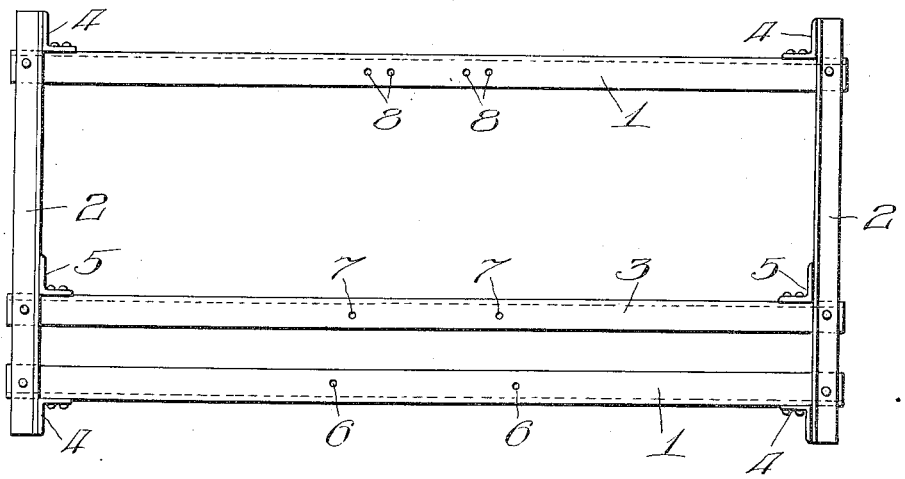
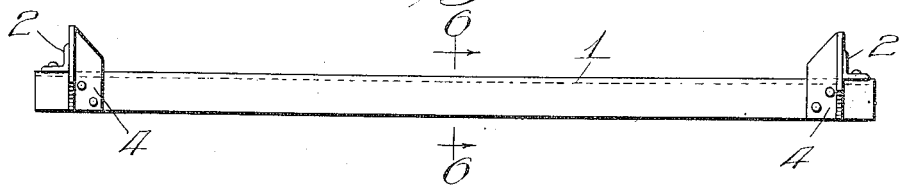
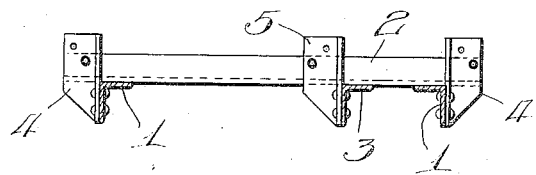
Witness:
Harry S. Gaither
Inventor
Jean K. Vanatta
by Brown Atty J. K. VANATTA.
POWER PLANT CONSTRUCTION FOR RAILWAY MOTOR CARS.
APPLICATION FILED FEB. 2, 1918.
1,271,630.
Patented July 9, 1918.
5 SHEETS—SHEET 4.
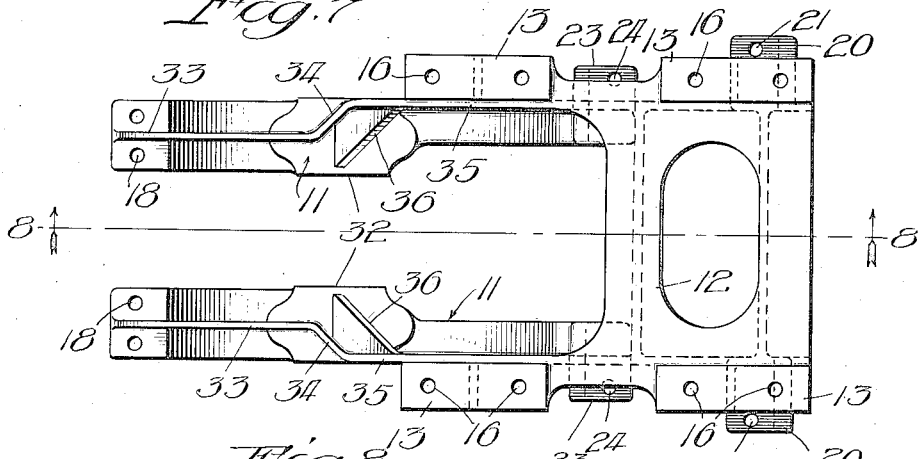
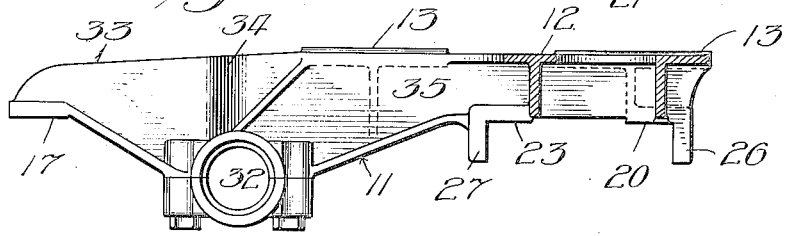
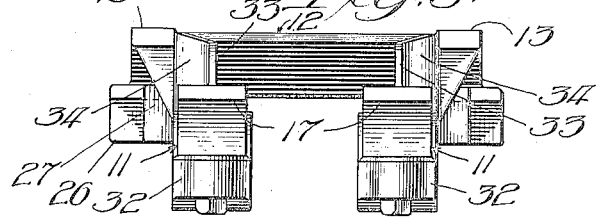
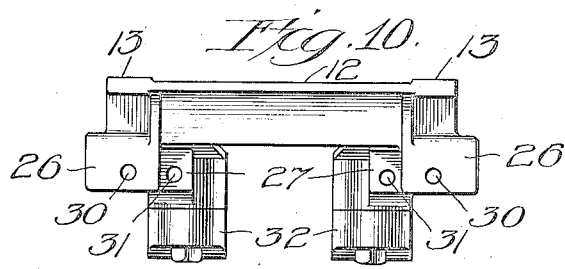
Witness:
Harry J. Gaither
Inventor:
Jean K. Vanatta
by Major E. Brown Atty

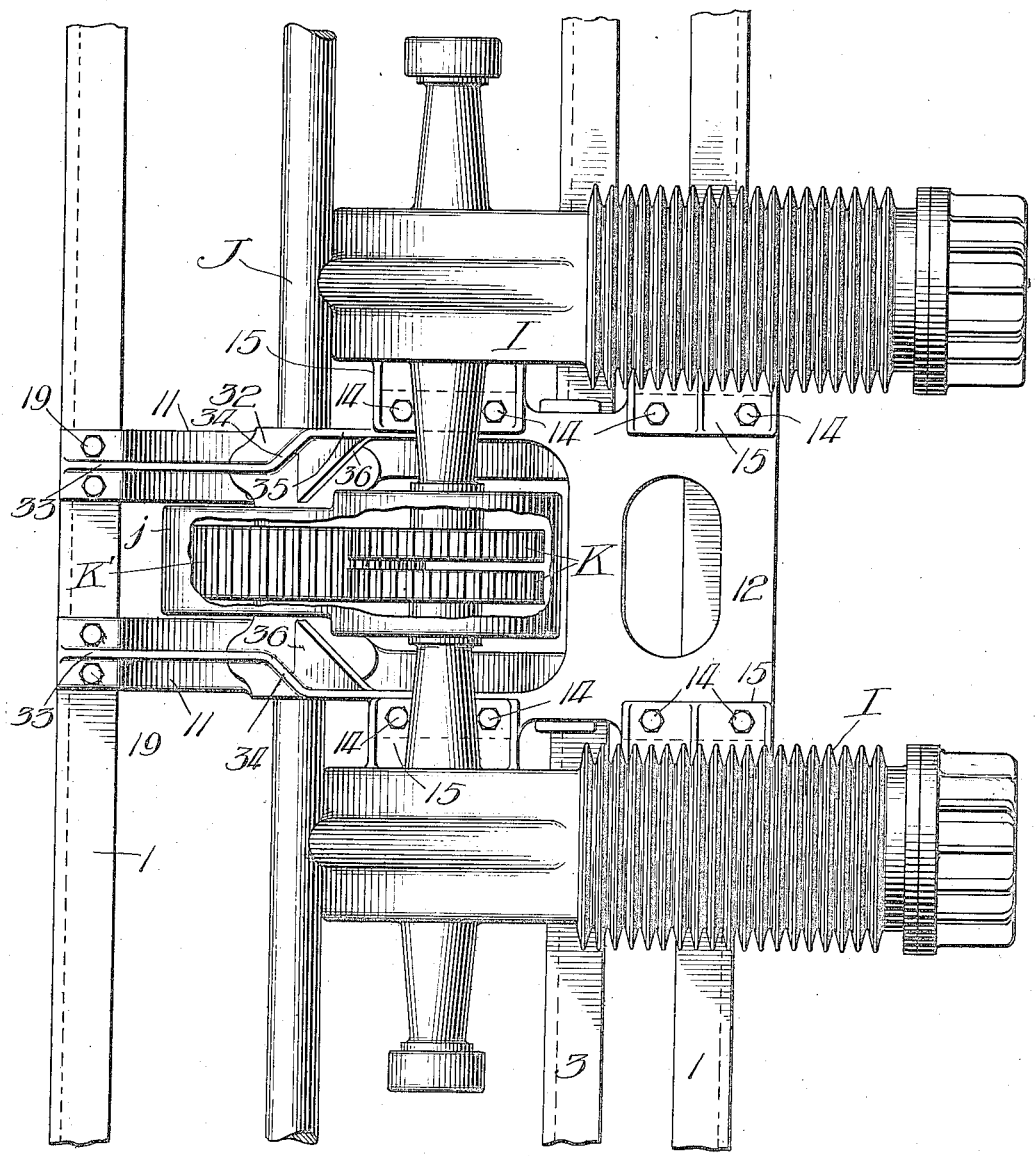

UNITED STATES PATENT OFFICE.

JEAN K. VANATTA, OF CHICAGO, ILLINOIS, ASSIGNOR TO MUDGE & COMPANY, OF CHICAGO, ILLINOIS, A CORPORATION OF ILLINOIS.

POWER-PLANT CONSTRUCTION FOR RAILWAY MOTOR-CARS.

1,271,630.      Specification of Letters Patent.      Patented July 9, 1918.

Application filed February 2, 1918. Serial No. 215,033.

*To all whom it may concern:*

Be it known that I, JEAN K. VANATTA, a citizen of the United States, and a resident of Chicago, in the county of Cook and State of Illinois, have invented certain new and useful Improvements in Power-Plant Construction for Railway Motor-Cars; and I do hereby declare that the following is a full, clear, and exact description thereof, reference being had to the accompanying drawings, and to the letters of reference marked thereon, which form a part of this specification.

This invention relates to new and useful improvements in railway motor cars for use of section workmen, inspectors or the like, and has for its object, more particularly, a construction whereby the various parts of the power plant may be readily assembled preparatory to being applied to the wooden frame of the motor car, the parts are accessible for repairs, the evil results of the shrinkage and swelling of wooden sills and the strains on crank shaft, driving axles and crank shaft gears are avoided and the breakage of such parts eliminated.

In the construction of motor cars of the type now quite generally in use where a wooden car frame is provided with longitudinal and transverse wooden sills and diagonal braces, it is customary, in mounting the power plant, to secure it directly to the wooden car frame, to mount the driving axle in bearings secured to the longitudinal wooden sills and to connect said axle and the engine crank shaft by suitable gearing.

In car constructions of this general type, there are many disadvantages. In normal weather conditions, but particularly in severe weather, the wood shrinks, swells and warps, thus throwing the engine, crank shaft and gears out of alinement, requiring constant readjustment of these parts and not infrequently the removal and renewal of some of them.

Again, where the engine base rests upon two longitudinal wooden sills, undue strains are thrown upon the driving axle, the crank shaft and crank shaft gears because the weight placed on the car is transferred through the crank shaft and gear units to the driving axle, frequently resulting in bending and in breaking of the driving axle. In said old construction, moreover, the engines are applied after the car frame is assembled, necessitating the lining up of the engine by the use of shims between the sills and engine bolt lugs. This is a disadvantage not only in assembling and applying the engine parts to the car frame, but is a construction which increases the initial cost of production, and when parts are worn out in service or broken, and have to be replaced, these old types of cars present difficulties to the ease and cheapness with which said parts may be removed for repairs or replacement.

These and other disadvantages are quite overcome by my invention herein described and claimed.

In said invention, I use a construction wherein all the weight of the car is so distributed as to ultimately rest upon the driving axle bearing points only. By using a steel sub-frame to which the engine base and engine is secured, and bolting this sub-frame to the outside, longitudinally disposed, wooden sills, I eliminate all the evil effects of the shrinking and swelling of the wooden sills, and the straining and breaking of the driving axle, the crank shaft and the crank shaft gears; and I avoid the necessity of constant realinement. Moreover, by first assembling the sub-frame, engine base and engine, the driving axle and driving wheels, as a unit, before applying the same to the wooden frame of the motor car, a more advantageous assembling of the parts of the motor car as a whole is accomplished, the alinement is more easily effected, the accessibility of the parts and their removal for purposes of repair or replacement is greatly promoted, the car as a whole is greatly improved, and its initial cost reduced.

With these objects in mind, I now proceed to describe my invention in that form illustrated in the accompanying drawings, wherein—

Figure 1 illustrates in a bottom plan view, a car constructed in accordance with and embodying my invention.

Fig. 2 is a side elevation, showing some of the parts in longitudinal, vertical section.

Fig. 3 is a transverse, vertical, sectional view taken on the plane indicated by the dotted line 3—3 of Fig. 2.

Fig. 4 is a plan view of the top of the steel sub-frame.

Fig. 5 is a side elevation of the sub-frame.

Fig. 6 is an end elevation of the sub-frame.

Fig. 7 is a top plan view of the engine base casting.

Fig. 8 is a central, longitudinal, vertical sectional view of the engine base, with the cap of the driving axle journal box in position, the section being taken on the plane indicated by the dotted line 8—8 of Fig. 7.

Fig. 9 is an elevation of the one end, say the front end, of the engine base.

Fig. 10 is an elevation of the other or rear end of the engine base.

Fig. 11 is a top plan view of the engine, engine base, and parts of the sub-frame, when assembled as a unit preparatory to being attached to the wooden frame of the motor car.

In said drawings, similar reference designations refer to like parts. Referring now more particularly to Figs. 1, 2 and 3, the letter A designates the wooden car frame as a whole; B, B the longitudinal side sills; C, C the transverse cross sills; D, D the diagonal longitudinal brace bars or sills; E the flooring, having an opening at e cut therethrough; c, c the front and rear end boards; b, b the two side boards or rails; all being of wood. F, F are metal rods or hand rails for lifting the car, these lifting rails extending across the front and rear ends of the car and being suitably mounted in the extended ends of the side rails b, b. The front wheels G, G are mounted upon an axle g, which latter is suitably held in bearing box journals H, H, secured near the rear end of the car to the lower edges of the side sills B, B.

The car frame illustrated is a preferred construction but modifications may be made and any well-known type of frame may be employed, as will be manifest as I proceed with my description.

Referring now to the sub-frame construction, more particularly illustrated in Figs. 4, 5 and 6, it will be seen that the two longitudinal side bars 1, 1 are secured together at their ends by transversely extending cross bars 2, 2, said bars being of conventional L-shaped metal and secured by rivets or other suitable means. Intermediate the side bars 1, 1, and parallelly arranged near the front one of them is a third L-shaped bar 3 which is similarly secured at its ends to the cross bars 2. Angle corner pieces 4, 4 brace and strengthen the connection of the bars 1, 2, 1, 2, as shown, while the angle corner pieces 5, 5 similarly unite and strengthen the connection of the bar 3 with the cross bars 2, 2. Two bolt holes 6, 6 on the front side bar 1, are somewhat spaced apart, as are the two bolt holes 7, 7 on the bar 3, while the bolt holes 8, 8 are four in number, spaced in two groups of two holes each for the purpose hereinafter stated.

It will be noticed that the angle corner pieces 4, 4 are, in one dimension, sufficiently long to extend from the lower edge of the bars 1, 1, to a distance somewhat above the top edge of the bars 2, 2, and that the top portion of the corner pieces 5, 5, similarly extend above the top edges of the bars 2, 2. These upper extended portions of the angle corner pieces 4, 5 afford means whereby the sub-frame as a whole may be secured to the under or lower side of the wooden car frame by bolts 9, 9, or otherwise, passing through the side sills B, B.

I will now describe Figs. 7, 8, 9 and 10, which illustrate the construction of the engine base which is secured to the metal sub-frame. This base is a single casting of special construction comprising two arm members 11, 11, suitably spaced apart and extending rearwardly from a main or uniting member 12. The latter is provided with a plurality of supporting surfaces, 13, 13, adapted to support the power plant which is secured to the base by bolts 14, 14 passing through flanges or lugs 15, 15, extending outwardly from the engine cylinders I, I, and through the apertures 16, 16 in lugs.

Bearing surfaces 17 on the lower or under face of each of the arm members 11, are adapted to contact with the top surface of the rear bar 1 of the sub-frame and are provided with bolt holes 18, 18 in pairs, whereby said ends of the arm members 11 may be firmly secured to said bar 1 by bolts 19, or other suitable means, passing through the holes 18, 18 and 8, 8. Extending outwardly from each side of the main member 12 of the base and near the front end thereof, are supporting flange surfaces 20, 20, each having a bolt hole 21 therethrough. These flange surfaces rest upon and are adapted to be secured to the front side rail 1 of the sub-frame by bolts 22, or other suitable means, passing through the holes 21 and 6. Similar flange surfaces 23 with bolt holes 24 are provided on the base member 12, the holes 24 registering with the holes 7 of the rail 3 of the sub-frame, whereby the rail 3 and said flanges are secured by bolts 25 or other means.

To further strengthen the union of the engine base and the sub-frame, I provide the flanges 20 and 23 with downwardly projecting members 26, 27, respectively, so spaced apart, as clearly shown in Figs. 2 and 8, as to snugly fit over and contact with the front rail 1 and the rail 3 of the sub-frame and are firmly united thereto by bolts 28, 29 respectively, or other means, passing through suitable apertures 30, 31.

It will thus be seen that the engine base casting may be firmly and securely fastened to the sub-frame structure, as the latter may be similarly secured to the wooden frame structure.

It will also be observed that the engine base thus acts as an additional or center brace for the side bars 1, 3 and 1, which constitute the longitudinal sills of the metal sub-frame, reinforcing these members and maintaining transverse alinement between the two engine cylinders I, I, mounted on said base.

In the under side of each arm, 1, 1, of the engine base, I provide an axle journal box 32 adapted to receive the driving axle J of the motor car. It will thus be seen that by firmly connecting the sub-frame, the engine base, the driving axle and the power plant, perfect alinement is attained, between the central longitudinal axis of said driving shaft and the center line of the gearing by which power is transmitted from the engine crank shaft to the driving axle, thus promoting the effectiveness of the power plant, insuring longer life to the gears and greatly improving the car as a whole.

It will be observed that the location of the axle journal box 32 is such that the axis of the driving axle J is in a plane appreciably below the plane of the bearing surfaces 17 and 20. It is very desirable to properly strengthen the end arm members 11 of the engine base, and to this end I provide a vertically disposed rib 33 extending centrally from the upper face of the end member toward the front, which rib member above the journal box 32 takes an outwardly direction at 34 to the side margin and continues as a side margin rib at 35. Above the journal box 32, a second strengthening rib member 36 is provided which extends upwardly and forwardly toward the rib 35, so that the inner edge, at the lower end of the rib, is practically the full width of the journal bearing.

The gears K, K on the crank shaft $k$ and the intermeshing gear K' on the driving axle J are suitably protected by the gear casing $j$ shown as partially broken away in Fig. 11 to disclose said gears. The driving axle J is suitably mounted in journal bearing boxes L, L which are securely bolted to the transverse members 2, 2 of the sub-frame, and carries on each end a driving wheel M.

Aside from the advantages hereinbefore mentioned, the construction which permits of the assembling of the parts just referred to into a unitary structure ready to be attached to a motor car frame has the further advantage of affording great facility in and of reducing the cost of manufacture, without detracting from the value and efficiency of the structure, and the standard shapes of which the sub-frame is made, afford opportunity for the attachment of the sub-frame and its associated parts, to almost any style or make of car frame.

In practice, I find it advantageous to make the distance apart of the two proximate faces of the flange members 26, 27 somewhat less than the distance apart of the front face of the front bar 1, from the rear face of the bar 3. In assembling the engine base and the sub-frame these two angle bar members 1 and 3 therefore, have to be sprung together, thus insuring a snug fit, after which the parts are firmly held together by the bolts, as stated. I then bolt the engine base firmly to the sub-frame, preferably using lock nuts. I then place the driving axle J with the driving gear K' attached in the bearings 32 of the engine base and then assemble the engine on the engine base. After this, I place the journal bearing boxes L, L over the axle and secure them to the members 2, 2 of the sub-frame and apply the wheels M, M and the unitary structure or independent power plant is then ready to be rolled under a car frame and secured thereto as heretofore described.

I do not desire to be limited to the precise details of construction shown and described except where the same are made the subject of claims, as many modifications may be made therein without departing from the spirit and principle of my invention; all of which modifications and equivalents I desire to be comprehended within the scope of my invention. Nevertheless, the form and arrangement herein shown, described and claimed, is recommended as a preferred construction after having been fully tested in practical use.

I claim as my invention:

1. In a motor car having a frame provided with longitudinally arranged sills and traction wheels, the axles of which are mounted in bearings secured to said sills on the under side of the car, the combination of a metal sub-frame, having longitudinally extending members and cross bar members, means for securing the sub-frame to the under side of the car frame with its longitudinal members arranged transversely of the car frame sills, an engine base member secured to said sub-frame lengthwise of the car frame and transversely of the sub-frame, an engine mounted on said base, a driving axle supported in journal bearings mounted on the sub-frame, driving wheels on the ends of said axle, operative connections between the engine and the driving axle, and journal bearings on the engine base adapted to support the driving axle intermediate its ends.

2. In a motor car having a wooden frame embracing longitudinally disposed side sills, a sub-frame of metal having end and side bars, means for securing said sub-frame to the under side of the car frame from side sill to side sill, a driving axle mounted in journal bearings located upon the end bars of the sub-frame and carrying driving wheels on the ends of the axle, and means intermediate the ends of the axle adapted to connect said axle and the longitudinal bars of the sub-frame together and brace the same against undue strains.

3. As a unitary structure for motor cars, a sub-frame comprising front and rear longitudinally disposed side bars 1, 1, an intermediate longitudinal bar 3 and end bars 2, 2, connecting said bars 1, 3, 1 together.

4. As a unitary structure for motor cars, a sub-frame comprising front and rear longitudinally disposed side bars 1, 1, an intermediate longitudinal bar 3 positioned near the front bar 1, and end bars 2, 2, connecting said bars 1, 3, 1 together.

5. As a unitary structure for motor cars, a sub-frame comprising front and rear longitudinally disposed side bars 1, 1, an intermediate longitudinal bar 3 positioned near the front bar 1, and end bars 2, 2, connecting said bars 1, 3, 1 together, said frame being provided with means for securing it to a motor car frame.

6. As a unitary structure for motor cars, a subframe comprising front and rear longitudinally disposed side bars 1, 1, an intermediate longitudinal bar 3 and end bars 2, 2, connecting said bars 1, 3, 1 together, said frame being provided with means for securing it to a motor car frame.

7. As a unitary structure for motor cars, a sub-frame comprising front and rear longitudinally disposed side bars 1, 1, an intermediate longitudinal bar 3 and ends bars 2, 2, connecting said bars 1, 3, 1 together, said sub-frame being provided with bracing members in the angles where the end bars 2, 2, cross the said longitudinal bars 1, 3 and 1.

8. A sub-frame for motor cars comprising front and rear longitudinally disposed side bars 1, 1, an intermediate longitudinal bar 3, end bars 2, 2, connecting said bars 1, 3 and 1 together, and angle plate members located in the angles where the end bars cross said longitudinally disposed bars, and lugs on said angle plate members extending above the plane of the top of the sub-frame.

9. The combination of a sub-frame adapted to be secured transversely to the lower side of a motor car frame, an engine and an engine base intermediate the engine and the sub-frame.

10. In combination with the frame of a motor car, a sub-frame secured transversely to the lower side of the car frame, an engine base intermediate the car frame and the sub-frame and an engine mounted on said base.

11. A motor car having a main frame provided with longitudinal sills, a metal sub-frame secured transversely of the car frame to said sills, an engine base secured to and transversely of the sub-frame and located between the latter and the car frame, an engine mounted upon and secured to said base and operative connections between the engine and the driving axle of the car.

12. In a motor car construction comprising a car or main frame, an engine and driving wheels, an engine base casting intermediate the traction wheels and the main frame, provided with journal bearings for the axle intermediate its ends, means for securing the engine to said casting, a sub-frame and means for connecting the casting to the sub-frame.

13. In a motor car comprising a car body or frame, a motor engine, and a driving axle, the combination of a structural metal sub-frame disposed transversely of the car frame, an engine base intermediate the car frame and the structural frame and transversely of the latter, and means for operatively connecting the engine with the driving axle.

14. The combination with the main frame and a driving axle of a motor car, of a metal sub-frame secured transversely to the lower side of the main frame, an engine base secured to the sub-frame intermediate the latter and the main frame, an engine mounted on the said base and operatively connected with the axle.

15. The combination with the main frame and a driving axle of a motor car, of a sub-frame of metal secured transversely to the lower side of the car frame, an engine base secured to the sub-frame transversely of the latter and longitudinally of the car frame and intermediate both frames, an engine mounted on said base and operatively connected with the driving axle.

16. As a article of manufacture, a casting for an engine base comprising a body portion and two arm members, bearing surfaces on the top of the body portion adapted to support an engine, a bearing shoulder upon the lower side of each arm member, and bearing shoulders on the lower side of the body portion.

17. As an article of manufacture, a casting for an engine base comprising a body portion and two arm members, bearing surfaces on the top of the body portion adapted to support an engine, a journal bearing in the lower side of each of the arm members adapted to engage a driving axle intermediate its ends, a bearing shoulder upon the lower side of each arm member, and bearing shoulders on the lower side of the body portion.

18. As an article of manufacture, a casting for an engine base comprising a body portion and two arm members, bearing surfaces on the top of the body portion adapted to support an engine, a bearing shoulder upon the lower side of each arm member, bearing shoulders on the lower side of the body portion, and a journal bearing in the lower side of each of the arm members adapted to engage the driving axle intermediate its ends, said journal bearing being located in a plane below that of the said lower bearing shoulders.

19. As an article of manufacture, a casting for an engine base comprising a body portion and two arm members, bearing surfaces on the top of the body portion adapted to support an engine, a bearing shoulder upon the lower side of each arm member, bearing shoulders on the lower side of the body portion, a journal bearing in the lower side of each of the arm members adapted to engage the driving axle intermediate its ends, said journal bearing being located in a plane below that of the said lower bearing shoulders, and a strengthening rib or web on the top of each arm member extending vertically and centrally from its end to a point near the journal bearing and then vertically and in an angularly direction above said bearing.

20. As an article of manufacture, a casting for an engine base comprising a body portion and two arm members, bearing surfaces on the top of the body portion adapted to support an engine, a bearing shoulder upon the lower side of each arm member, bearing shoulders on the lower side of the body portion, a journal bearing in the lower side of each of the arm members adapted to engage the driving axle intermediate its ends, said journal bearing being located in a plane below that of the said lower bearing shoulders, a strengthening rib or web on the top of each arm member, extending vertically and centrally from its end to a point near the journal bearing and then vertically and in an angular direction above said bearing, and a second vertically disposed rib above the journal bearing extending angularly of the first mentioned rib.

21. As an article of manufacture, a casting for an engine base comprising a body portion and two arm members, bearing surfaces on the top of the body portion adapted to support an engine, a bearing shoulder upon the lower side of each arm member, bearing shoulders on the lower side of the body portion, and a journal bearing in the lower side of each of the arm members adapted to engage the driving axle intermediate its ends, said journal bearing being located in a plane below that of the said lower bearing shoulders, said bearing shoulders on the lower side of the body portion being each provided with downwardly projecting bearing flanges.

22. The combination with a metal sub-frame adapted to be secured to a motor car frame, and having angle iron longitudinal front and rear side bars and an intermediate longitudinal bar, of a cast metal engine base provided with bearing shoulders adapted to be secured to said longitudinal bars, the front bearing surfaces having downwardly directed flange members with proximate parallel faces adapted to embrace the front and rear faces of the front and intermediate bars respectively, of said sub-frame.

23. The combination with a metal sub-frame adapted to be secured to a motor car frame, and having angle iron longitudinal front and rear side bars and an intermediate longitudinal bar, of a cast metal engine base provided with bearing shoulders adapted to be secured to said longitudinal bars, the front bearing surfaces having downwardly directed flange members with proximate parallel faces adapted to embrace the front and rear faces of the front and intermediate bars, respectively, of said sub-frame, and a driving axle mounted in journal bearings located on the end members of the sub-frame.

24. The combination with a metal sub-frame adapted to be secured to a motor car frame, and having angle iron longitudinal front and rear side bars and an intermediate longitudinal bar, of a cast metal engine base provided with bearing shoulders adapted to be secured to said longitudinal bars, the front bearing surfaces having downwardly directed flange members with proximate parallel faces adapted to embrace the front and rear faces of the front and intermediate bars respectively, of said sub-frame, a driving axle mounted in journal bearings located on the end members of the sub-frame and a journal bearing on the lower side of each engine base arm adapted to engage said axle intermediate said first mentioned journal bearings.

25. The combination with a metal sub-frame adapted to be secured to a motor car frame, and having angle iron longitudinal front and rear side bars and an intermediate longitudinal bar, of a cast metal engine base provided with bearing shoulders adapted to be secured to said longitudinal bars, the front bearing surfaces having downwardly directed flange members with proximate parallel faces adapted to embrace the front and rear faces of the front and intermediate bars respectively, of said sub-frame, a driving axle mounted in journal bearings located on the end members of the sub-frame, a journal bearing on the lower side of each engine base arm adapted to engage said axle intermediate said first mentioned journal bearings, an engine mounted on said base and means for securing the sub-frame to the lower side sills of the car frame.

In testimony, that I, claim the foregoing as my invention I affix my signature in the presence of two witnesses, this 30th day of January A. D. 1918.

JEAN K. VANATTA.

Witnesses:
TAYLOR E. BROWN,
BERTHA L. MACGREGOR.